United States Patent [19]

Ueno

[11] Patent Number: 4,819,893

[45] Date of Patent: Apr. 11, 1989

[54] CLUTCH MECHANISM THUMB BUTTON MOUNTING FOR FISHING REEL

[75] Inventor: Tadashi Ueno, Udea, Japan

[73] Assignee: Matsuo Kogyo Kabushiki Kaisha, Japan

[21] Appl. No.: 109,438

[22] Filed: Oct. 16, 1987

[51] Int. Cl.⁴ .......................................... A01K 89/015
[52] U.S. Cl. ..................................... 242/220; 242/221
[58] Field of Search ......... 242/84.1 R, 84.53, 211–221

[56] References Cited

U.S. PATENT DOCUMENTS

| | | | |
|---|---|---|---|
| 806,494 | 12/1905 | Pyott | 242/221 |
| 842,551 | 1/1907 | Hunter | 242/221 |
| 3,268,182 | 8/1966 | Clark | 242/221 X |
| 4,564,158 | 1/1986 | Moosberg et al. | 242/212 X |
| 4,575,024 | 3/1986 | Kaneko | 242/218 |
| 4,593,869 | 6/1986 | Yasui et al. | 242/218 X |
| 4,640,471 | 2/1987 | Murakami et al. | 242/212 X |

FOREIGN PATENT DOCUMENTS 78526  5/1985  Japan .................................. 242/220

OTHER PUBLICATIONS

"Sigma Mag-Lite", *Shakespeare 1987 Catalogue*, p. 27.

Primary Examiner—Joseph J. Hail, III
Attorney, Agent, or Firm—Melvin R. Stidham

[57] ABSTRACT

A bait casting reel has a clutch mechanism in one side of the reel body. A frame member is securedly fixed across the side reel plates at the back of the reel and includes a slideway in which is slideably mounted a thumb-operated push button. The thumb button is mechanically connected to the clutch mechanism so that, when depressed, the thumb button disengages the clutch for free spool operation. The frame in which the thumb button is mounted provides strength and rigidity to the reel, and the thumb button enables convenient thumb operation while holding a fishing rod.

2 Claims, 6 Drawing Sheets

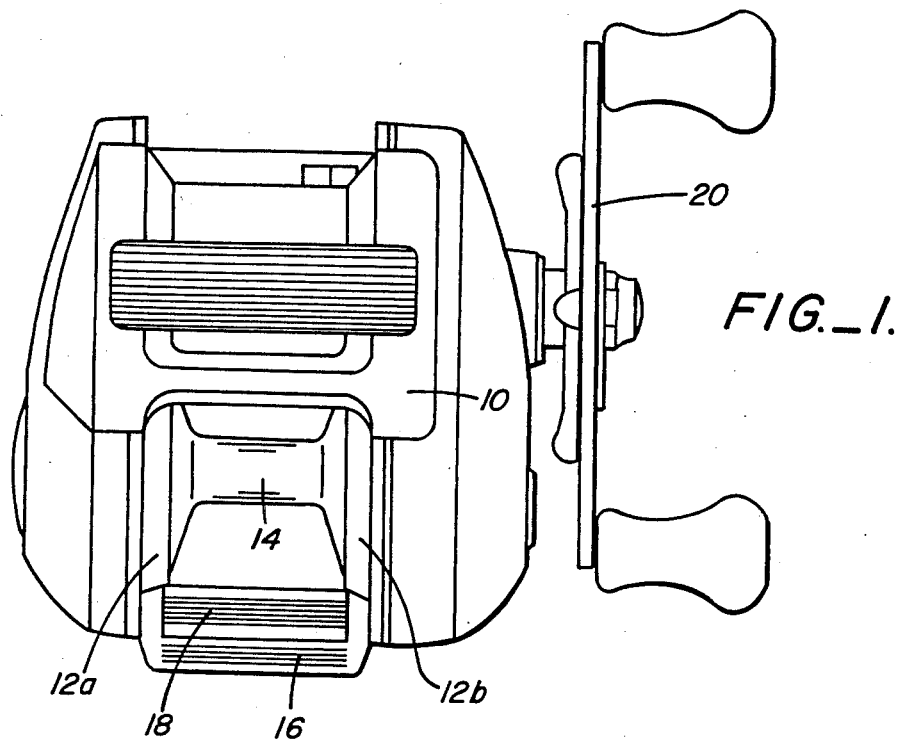
FIG._1.
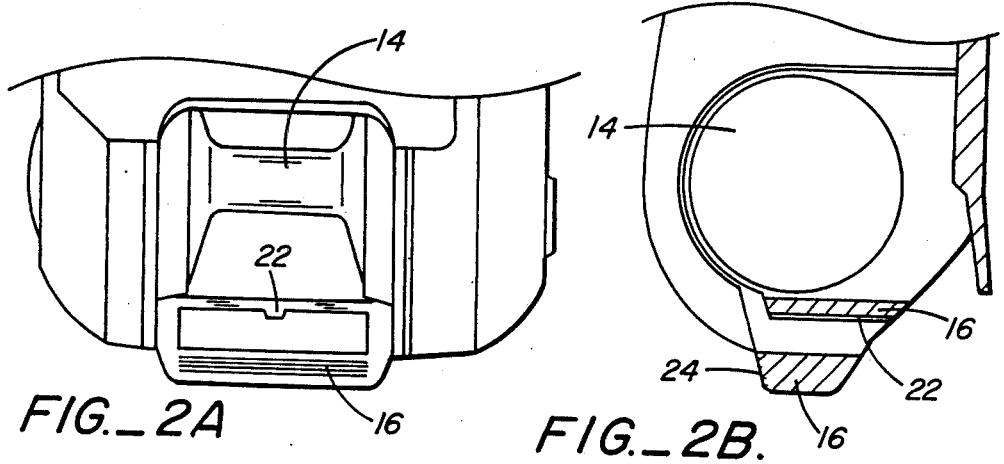
FIG._2A.  FIG._2B.
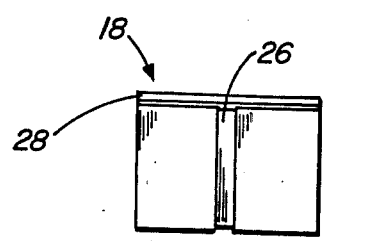
FIG._3A.
FIG._3B.
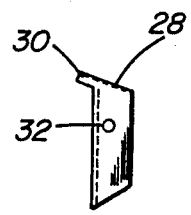
FIG._3C.

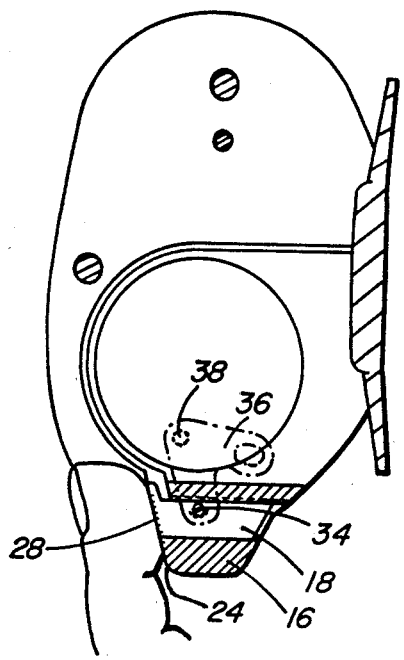
FIG._4.
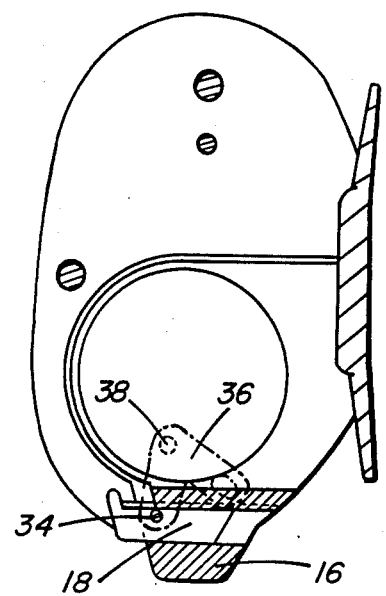
FIG._6.
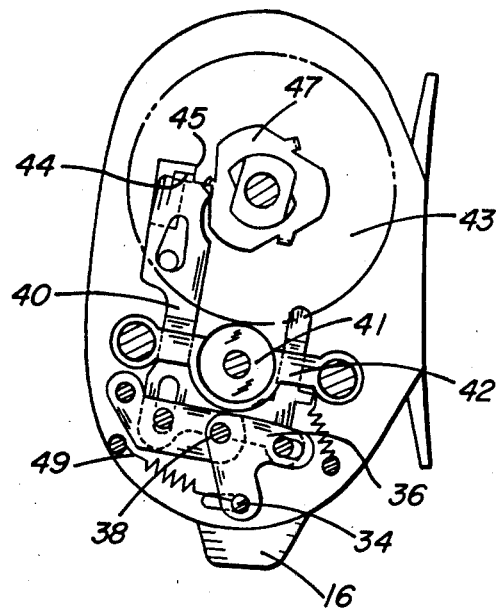
FIG._5.
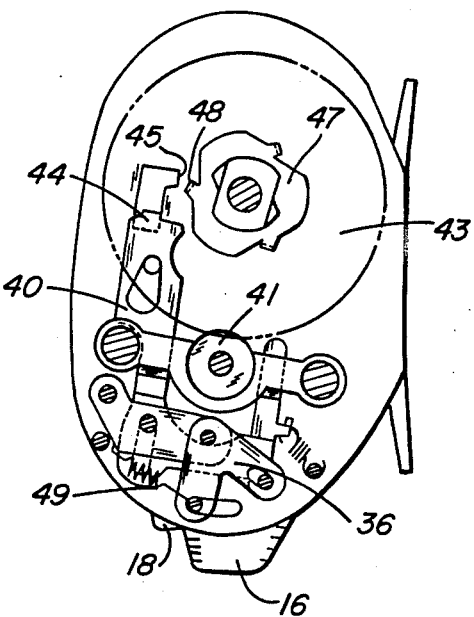
FIG._7.

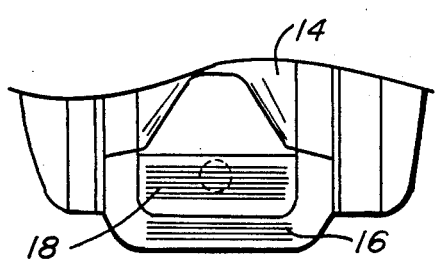
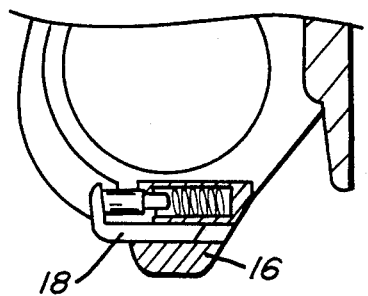
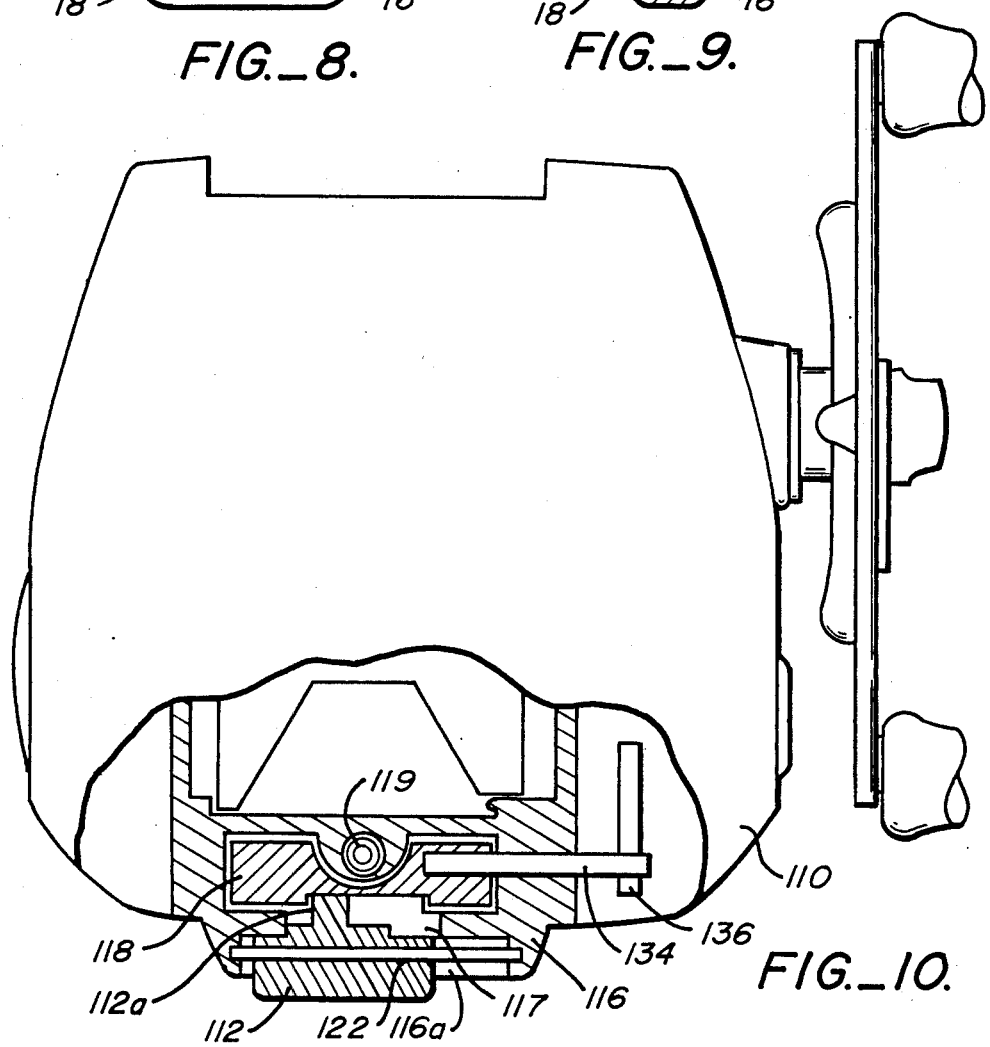
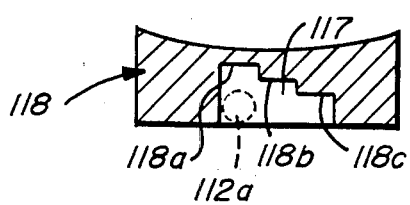

CLUTCH MECHANISM THUMB BUTTON MOUNTING FOR FISHING REEL

BACKGROUND OF THE INVENTION

Bait casting reels are commonly provided with a clutch mechanism between the crank handle and the spool. With the clutch disengaged, the spool rotates freely for casting a lure. After casting, the clutch is engaged to transmit power from the crank handle to the spool for retrieving the fishing line. In many fishing reels, the clutch is operated by means of a thumb lever pivotably mounted on a pin extending across the body of the reel. In operation, the clutch is disengaged by depressing the lever with the thumb of one hand and then moving the same thumb to the reel to brake the spool prior to casting. After casting, the clutch is engaged by initial rotation of the crank handle to wind the line onto the spool.

Conventional, thumb-operated clutch levers are mounted to extend across the back part of the reel. This precludes the location of any strengthening members between the sides of the reel at the back portion of the reel in the area where the clutch control lever is mounted.

OBJECTS OF THE INVENTION

It is an object of this invention to provide a clutch mechanism for a fishing reel that is operated by a thumb button located at the back of the reel to provide, not only convenient operation, but to strengthen the reel by interconnecting the opposite sides of the reel.

It is a further object of this invention to provide a thumb-operated clutch mechanism that provides substantial rigidity and stability to the reel.

It is a further object of this invention to provide a thumb-operated clutch mechanism that be set selectively so that when operated it conditions the reel either for free spool operation or for flipping operation wherein the clutch is reengaged as soon as the thumb button is released.

Further objects and advantages of this invention will become apparent from the description to follow, particularly when read in conjunction with the accompanying drawing.

SUMMARY OF THE INVENTION

In carrying out this invention a bait casting reel is provided with a substantial and stable slideway frame secured across the back of the reel to join and support the opposite sides. Slideably mounted in the body frame for vertical movement is a thumb-operated push button that operates the clutch mechanism. Hence, the clutch mechanism activating system provides convenient thumb operation and because the frame in which the thumb button slides is secured between the sides of the reel, it strengthens and rigidifies the reel substantially.

BRIEF DESCRIPTION OF THE DRAWINGS

In the drawings:

FIG. 1 is a plan view of one embodiment of this invention;

FIG. 2(a) and (b) are plan and section views of the push button frame;

FIG. 3(a), (b) and (c) are front, plan and side views showing the clutch actuating push button;

FIGS. 4 and 5 are section views showing the clutch push button and the clutch mechanism in disengaged position;

FIGS. 6 and 7 are section views showing the clutch push button and the clutch mechanism in engaged position.

FIG. 8 is a partial plan view of another embodiment of this invention;

FIG. 9 is a partial section view of the embodiment of FIG. 8;

FIG. 10 is a plan view partially broken away of still another embodiment of this invention; and FIG. 11 is a partial section view of the embodiment of FIG. 10.

DESCRIPTION OF PREFERRED EMBODIMENTS

The Embodiments of FIGS. 1 to 7

Referring now to the drawings with greater particularity, the bait casting reel of this invention 10 includes side plates 12a and 12b between which a spool 14 is freely rotatable. Integral with or securely fixed to and between the side plates 12a and 12b is the slideway frame 16 in which is slideably mounted for vertical movement a thumb-operated, clutch actuating push button 18. With the thumb button 18 located at the rear of the reel body 10, it not only enables operation of the clutch mechanism to be described with the thumb of a hand gripping the rod (not shown), but the slideway frame (16) provides substantial strengthening support to the reel body 10 by virtue of the frame 16 being secured to and between the slide plates 12a and 12b.

As shown particularly in FIG. 2a the push button frame 16 has a rectangular opening in which the rectangular push button 18 is mounted for vertical sliding movement, guided by engagement of a guide 22 on the frame 16 in a complementary slot 26 (FIG. 3) in the thumb button 18. As shown, the top face 24 (FIG. 2(b) of the frame 16 is provided with a plurality of grooves or ridges for engagement by the thumb during casting.

As shown in FIGS. 3(a), (b) and (c), a groove 26 in a side face of the push button 18 engages with the linear guide 22, projecting from the inside wall of the slideway frame 16. A thumb operating surface 28 on the top of the clutch push button is grooved for an improved friction grip, and a stop member 30 projects from the edge of that surface 28 so that, when the clutch push button 18 is fully depressed, the stop member 30 engages the upper face of the slideway frame 16 to limit movement of the clutch lever 18. A small hole 32 in the sides face of the push button adjacent the reel body side plate 12b is engaged by a pin 34 (FIG. 4) on a V-shaped bell cranked lever 36, which is linked to the clutch mechanism inside the reel body 10.

When the clutch mechanism thumb button 18 is completely depressed, to the position shown in FIG. 4, the upper surface 28 on the thumb button is at substantially the level of the thumb rest 24 on the slideway 16. The V-shaped bell crank lever 36 provided inside the reel body 12b is pivoted on a pin 38 so that when the clutch actuating thumb button 18 is depressed, the pin 34 is moved to the right in FIGS. 4 and 5 to pivot the link 36 in a counterclockwise direction. This moves a clutch slide 40 toward a pinion gear 41, pushing the pinion upward through the medium of clutch yoke 42, disengaging the pinion 41 from a drive gear 43. When the clutch lever is depressed completely, the top end 44 of the clutch slide 40 is retained by a hanger 45 on the reel body to allow the spool to rotate freely.

Referring now to FIGS. 6 and 7 the clutch operating elements are shown in engaged position. When the handle 20 of the fishing reel 10 is initially turned in a line retrieving direction, a pawl 48 is released from the rachet 47 and contacts the top end 44 of the clutch side 40 to allow the clutch slide to drop to the position shown in FIG. 7. As a result, the pinion 41 drops down to engage the drive gear 43, whereby the handle 20 and the spool 14 are coupled, i.e. the clutch is engaged. A spring 49 pulls the V-shaped link 36 back in a clockwise direction to the position shown in FIGS. 6 and 7. In this position, the clutch push button is pushed upward by engagement of the pin 34 on the bell crank lever 36, so that it projects above the top face of the frame 16.

With the clutch control mechanism of this invention as described, an angler can easily disengage or engage the clutch by simple operation of the clutch thumb button 18. The holder or slideway 16 protects the thumb button 18 and increases strength of the reel body by rigid attachment between the sides 12a, 12b thereof. On casting a lure, an angler can hold the rod (not shown) firmly while he depresses the thumb button.

The Embodiment of FIGS. 8 and 9

In this embodiment, a spring is provided to bias the thumb button 18 back to its elevated position augmenting the operation of the pin 34 engaging the button 18 (FIG. 4). This reduces the likelihood that the button 18 will become skewed in the frame 16 by reason of its linkage at one side only to the lever 36.

The Embodiment of FIGS. 10 and 11

In the embodiment previously described, when the clutch actuating thumb button 18 is fully depressed, the clutch mechanism is locked in its free spool position until the reel handle 20 is initially turned to rewind the line onto the spool 14. If the actuating button 18 is partially depressed, the clutch engagement mechanism is moved to a "free spool" position, but it is not locked in that position and the clutch mechanism is reengaged immediately upon release of the button 18. In the embodiment of FIGS. 10 and 11 that is accomplished by providing a clutch button selector slide 112, which is slideably mounted on a pin 122 extending across a recess 116a in the slideway frame 116.

Carried on the clutch button selector slide 112 is a stop member 112a that extends into a stepped recess 117 in the face of the thumb button 118. When the selector slide 112 is moved to the left, as shown in FIG. 10, the stop member 112a is engaged by the surface 118a on the thumb button 18 whereby the thumb button may be fully depressed causing the pin 134 to shift and lock the lever 136 of the clutch mechanism in its disengaged or "free spool" condition. The intermediate position of the selector slide 112 defines the "flipping" condition, wherein the clutch mechanism is disengaged but it is re-engaged immediately upon release of the thumb button 118. In the far right position of the selector slide 112 the stop member 112a is engaged by the surface 118c to prevent the push button 118 from being depressed at all, maintaining the clutch mechanism engaged. This enables the clutch mechanism to be operated by a separate button or lever when provided. A spring 119 may be provided for positive return of the push button or thumb bar 118.

While this invention has been described in conjunction with preferred embodiments thereof, it is obvious that modifications and changes therein may be made by those skilled in the art to which it pertains without departing from the spirit and scope of this invention, as defined by the claims appended hereto.

What is claimed as invention is:

1. In a bait casting reel wherein there is a reel body with generally parallel, spaced side plates, a spool rotatably mounted between said side plates, a crank, a clutch mechanism interposed between said crank and said spool, operative when engaged to enable an angler to rewind a fishing line manually and when disengaged to enable the spool to rotate freely, and a clutch actuating lever operative in a first position to engage said clutch mechanism and in a second position to disengage said clutch mechanism;

the improvement comprising:

a frame mounted on said reel body between said side plates;

a thumb button slidably mounted in said frame;

means engaged between said thumb button and said clutch actuating lever so that said lever is moved to said second position by full depression of said push button;

a selector control slidably mounted on said frame;

complementary stop members on said selector control and said thumb button operative when said control is in a first position to enable full depression of said thumb button and when said selector control is in a second position to enable only partial depression of said thumb button whereby when said thumb button is released said clutch actuating lever returns to said first position.

2. The combination defined by claim 1 wherein:

said complementary stop members are operative when said selector control is in a third position to prevent depression of said thumb button.

* * * * *